United States Patent [19]

Demay et al.

[11] Patent Number: 4,917,734
[45] Date of Patent: Apr. 17, 1990

[54] GRAFTED ETHYLENE POLYMERS AND COPOLYMERS AND THEIR APPLICATIONS AS BINDERS FOR COATING

[75] Inventors: Henri Demay, Senlis; Remi Hauschild, Paris; Adrien Nicco, Bethune, all of France

[73]. Assignee: Norsolor (Orkem Group), Paris, France

[21] Appl. No.: 261,379

[22] Filed: Oct. 24, 1988

[30] Foreign Application Priority Data

Oct. 22, 1987 [FR] France ................ 87 14599

[51] Int. Cl.$^4$ ............... C08L 91/06; C08F 265/02; C08C 19/00
[52] U.S. Cl. ................. 106/270; 106/271; 525/301; 525/386
[58] Field of Search ............... 106/270, 271; 525/301; 526/317, 386

[56] References Cited

U.S. PATENT DOCUMENTS

| | | | |
|---|---|---|---|
| 3,211,808 | 10/1965 | Young et al. ............. | 525/301 |
| 3,347,956 | 10/1967 | Rademacher ............. | 525/301 |
| 3,652,730 | 3/1972 | Billere et al. ............. | 525/259 |
| 3,859,385 | 1/1975 | Mainord ............. | 525/301 |

FOREIGN PATENT DOCUMENTS

| | | | |
|---|---|---|---|
| 1566391 | 2/1968 | France . | |
| 2424931 | 11/1979 | France . | |
| 58965 | 6/1969 | Luxembourg . | |
| 981586 | 1/1965 | United Kingdom ............. | 525/301 |
| 2022597 | 12/1979 | United Kingdom . | |

OTHER PUBLICATIONS

Chemical Abstracts, vol. 97, No. 13, Oct. 1982, p. 41 97:128585q.

*Primary Examiner*—Theodore Morris
*Attorney, Agent, or Firm*—Millen, White & Zelano

[57] ABSTRACT

The present invention relates to grafted ethylene polymers and copolymers characterized in that they are thermoplastic and, if appropriate, crosslinkable and soluble at ambient temperature in organic solvents and/or aqueous media and in that they are prepared by polymerization of (in % by weight relative to the resin obtained):

0.5 to 30% of at least one unoxidized polyethylene and/or an unoxidized ethylene copolymer based on at least 70% by weight of ethylene, the said polyethylene or ethylene copolymer being defined by the following properties:

a weight average molecular weight (Mw) between 900 and 60,000, a Brookfield viscosity at 190° C. of between 0.1 and 500 poises and/or a Brookfield viscosity at 140° C. of between 0.1 and 2,000 poises.

a crystallinity, measured using X rays, of between 10% and 80%, and, if desired, containing ester, anhydride or acid functional groups originating from the ethylene comonomers, 70 to 99.5% of unsaturated monomers such as styrene-based, vinyl, acrylic and/or methacrylic monomers, in the presence of at least one free radical initiator and of at least one organic solvent.

The invention also relates to a process for preparing these resins and to their applications as binders in coatings such as paints, varnishes and inks.

13 Claims, No Drawings

GRAFTED ETHYLENE POLYMERS AND COPOLYMERS AND THEIR APPLICATIONS AS BINDERS FOR COATING

BACKGROUND OF THE INVENTION

The present invention relates to new resins which are grafted polyethylenes or grafted ethylene copolymers and which are thermoplastic or, where appropriate, cross-linkable and soluble at ambient temperature in organic solvents and/or aqueous media.

The invention also relates to a process for preparing these resins and to their application as binders for coating, especially in paints, varnishes and inks.

Grafted ethylene poly- and copolymers are now well known. They have properties which are modified but which remain close to those of the original ethyene poly- and copolymer, the grafting being sed, above all, to modify certain specific characteristics such as dyeability and improvement in adhesion. They are, in fact, thermoplastic and insoluble at ambient temperature in the usual organic solvents such as hydrocarbons, alcohols, esters, ethers and ketones.

Various methods of manufacturing these grafted ethylene poly- and copolymers are known.

According to a first method, sheets of polyethylene brought into contact with monomers by themselves or in solution are subjected to high-energy radiations such as α or γ rays or an electron bombardment. Sheets of polyethylene with modified surface properties are obtained. The formation of homopolymers in the solution is also observed.

According to a second method, described in European Application No. 100,912, the grafting operation is carried out on polyethylene in a molten state in the presence of styrene and of free radical initiators, and, if desired, an organic solvent. In parallel with the formation of homopolymers, modified polyethylenes exhibiting excellent adhesiveness and used as adhesives on polyolefins are obtained. These modified polyethylenes are not soluble in organic solvents at ambient temperature.

SUMMARY OF THE INVENTION

The subject of the present invention is grafted ethylene poly- and copolymers having varied chemical and physical characteristics which are widely different from those of the original polyethylene, namely grafted ethylene and copolymers capable of being thermoplastics or, where appropriate, crosslinkable, and which are soluble in organic solvents at ambient temperature and/or in aqueous media.

More precisely, the subject of the invention is hylene poly- and copolymers characterized in that they are thermoplastic or, if appropriate, crosslinkable, soluble at ambient temperature in organic solvents and/or aqueous media, and in that they are prepared by polymerization of (in % by weight relative to the resin obtained):
- 0.5 to 30% of at least one unoxidized polyethylene and/or an unoxidized ethylene copolymer based on at least 70% by weight of ethylene, the said polyethylene or ethylene copolymer being defined by the following properties:
  - a weight average molecular weight (Mw) of between 900 and 60,000,
  - a Brookfield viscosity at 190° C. of between 0.1 and 500 poises and/or a Brookfield viscosity at 140° C. of between 0.1 and 2,000 poises,
  - a crystallinity, measured by X rays of between 10 and 80%,
  - and, if appropriate, comprising ester, anhydride or acid functional groups originating from the ethylene comonomers,
- 70 to 99.5% of unsaturated monomers such as styrene-based, vinyl, acrylic and/or methacrylic monomers, in the presence of at least one free radical initiator and at least one organic solvent.

In the text which follows, reference will be made to ethylene poly- and copolymers to denote both unoxidized polyethylenes and unoxidized ethylene copolymers based on at least 70% by weight of ethylene and whose properties (mw, viscosity at 190° C. or 140° C., crystallinity) are defined above unoxidized polyethylene and anoxidized. ethylene copolymers mean polyethylenes and ethylene copolymers which have not been subjected to an oxidation treatment.

In previous work, described in French Patent application No. 86/05,779, the assignee (now named NORSOLOR and formerly SOCIETE CHIMIQUES DES CHARBONNAGES S.A.) has developed thermoplastic or thermosetting grafted polyethylenes, soluble in organic solvents and/or aqueous media. Before the grafting, these polyethylenes are subjected to an oxidation operation.

Surprisingly, it has now been found that it is also possible to manufacture thermoplastic or, where appropriate, crosslinkable resins which are soluble in organic solvents and/or aqueous media from unoxidized ethylene poly- or copolymers polymers having, furthermore, the characteristics referred to above.

Among the ethylene copolymers which are suitable for the present invention there may be mentioned the terpolymers described in French Patent No. 2,498,608 and comprising (in mol %):
- 88 to 98.7% of ethylene-derived units,
- 1 to 10% of units derived from an ester chosen from alkyl acrylates and methacrylates, the said alkyl group containing from 1 to 6 carbon atoms, and
- from 0.3 to 3% of units derived from maleic anhydride.

To this list, there may also be added terpolymers based on ethylene (at least 70% by weight), vinyl acetate and acrylic acid or methacrylic acid, and terpolymers based on 80 to 98.5 mol % of ethylene, 1 to 15 mol % of acrylic or methacrylic ester and 0.5 to 5 mol% of acrylic acid or methacrylic acid.

Among the unsaturated monomers which are perfectly suitable for forming side chains of the polyethylene there may be mentioned methacrylic and acrylic monomer such as (meth)acrylic acid, (meth)acrylic esters, for example methyl (meth)acrylate, ethyl (meth)acrylate, butyl (meth)acrylate, 2-ethylhexyl (meth)acrylate, hydroxylated methacrylic monomers such as 2-hydroxyethyl (meth)acrylate and 2-hydroxypropyl (meth)acrylate, (meth)acrylic monomers containing amino groups such as N,N-dimethylaminoethyl (meth)acrylate and N,N-diethylaminoethyl (meth)acrylate, styrene-based monomers such as styrene and methylstyrenes, and vinyl polymers such as vinyl acetate.

Among the radical polymerization initiators which can be employed there may be mentioned peroxides such as benzoyl peroxide, di-tertbutyl peroxide and lauryl peroxide, perbenzoates such as tert-butyl perbenzoate, hydroperoxides such as cumene hydroperoxide, and diazocompounds such as 2,2'-azobis(isobutyronitrile) and 2,2'Zazobis(2-methylbutyronitrile). The radical polymerzation initiators are generally employed in a proportion of 1 to 4% by weight of initiator relative to the weight of the monomers.

Another subject of the present invention is a process for preparing the resins according to the invention according to which:

(a) a disperse phase is prepared by dispersing at least one polyethylene and/or at least one ethylene copolymer in at least one organic solvent, with stirring, at a temperature above the melting temperature of the said polyethylene or of the said ethylene copolymer;

(b) at least one ethylenic monomer and at least one radical polymerization initiator are then introduced progressively into the disperse phase obtained, so as to allow grafting of monomer chains onto the polyethylene and/or onto the ethylene copolymer. The introduction of the ethylenic monomer(s) generally takes between 1 and 6 hours, and preferably between 2 and 4 hours, (c) to complete the polymerization, the reaction is then continued at a temperature equal to or higher than that chosen in step (b). Depending on the circumstances, this step takes between ½ and 2 hours and preferably 1 ½ hours.

A reaction temperature which is approximately 5° to 15° C. higher relative to the melting temperature of the polyethylene or of the ethylene copolymer is preferably provided for, for ease of implementation, during step (a).

Also preferably, the temperature during the step (b) is kept constant at a value equal to or higher than that chosen in the step (a).

At the end of reaction, after cooling, the resin manufactured is treated in a suitable manner according to its subsequent destination, a few examples of which will be given in the text which follows. Thus, when the resin obtained contains carboxyl functional groups, it can be solubilized in aqueous media and may be capable of being diluted with water when these carboxyl functional groups are neutralized with a base such as an amine and/or an amino alcohol.

The organic solvent(s) employed in the process according to the invention forms (form) the medium in which the polyethylene and/or the ethylene copolymer which are insoluble at ambient temperature are dispersed; step (a) of the invention is concerned. A progressive solubilization of the polyethylene and/or of the ethylene copolymer is then observed in step with the progress of the reaction of formation of monomer chains on the polyethylene and/or ethylene copolymer (step b).

Among the organic solvents which can be employed in the process according to the invention, mention may be made of glycols such as ethylene glycol and propylene glycol, esters such as ethyl glycol acetate, ethers such as butyl glycol, higher alcohols such as n-butanol and benzyl alcohol, or aromatic solvents such as xylene and toluene. It is also possible to employ as a solvent organic compounds which have a high boiling point or organic compounds which are solid at ambient temperature. These compounds must be relatively inert towards the reaction mixture and must have a low viscosity at the temperature of reaction. In fact, it may be particularly advantageous to employ as a solvent a compound with low volatility at ambient temperature and having particular properties which will benefit the resins according to the invention. In this latter category of solvent there may be mentioned plasticizers such as phthalates, adipates and citrates, oxyethylenated derivatives such as oxyethylenated lauryl alcohol, nonylphenol containing, on average 10 molecules of ethylene oxide (abbreviated name NP 10), nonylphenol containing, on average, 30 molecules of ethylene oxide (abbreviated name NP 30) or nonylphenol containing, on average, 100 molecules of ethylene oxide (abbreviated name NP 100), and trialkyl phosphates such as trimethyl phosphate, triethyl phosphate and tributoxyethyl phosphate, which endow the formulated resin with an excellent heat resistance. It is also possible to employ a combination of two or more of the solvents referred to above.

The invention is advantageous for more than one reason.

First of all, the resins according to the invention constitute a new diverse range of resins based on polyethylene and/or ethylene copolymer, which are soluble at ambient temperature in common organic solvents such as alcohols, esters, ethers or ketones or else capable of being diluted with water, thermoplastic or, if appropriate, crosslinkable when the resin obtained contains carboxyl or hydroxyl or amine functional groups by reaction with crosslinking agents such as epoxy resins and/or amino plastic resins, for example urea-formaldehyde resins or melamine-formaldehyde resins.

Furthermore, these resins are obtained by a process which is easy to implement. When compared with those described in French Patent Application No. 86/05,779, the resins according to the invention do not require any oxydation treatment prior to their preparation.

The examples which will follow, and which are given by way of guidance, will enable the invention to be better understood.

In these various examples, the quantities of products are expressed in parts by weight and the percentages are percentages by weight.

EXAMPLE I:

490 parts of ethyl glycol, 2 parts of 2,2-azobis-(isobutyronitrile) and 136 parts of a polyethylene wax which has the following characteristics are introduced into a reactor fitted with a stirring device:

| | |
|---|---|
| Weight average molecular weight (Mw) | 2,600 |
| Crystallinity (%) | 10 |
| Viscosity at 140° C. (poises) | 0.6 |
| Melting temperature (°C.) | 90–97 |

The temperature is raised to 125° C. and a mixture of monomers and radical initiators is introduced continuously for a period of three hours into the perfectly homogeneous phase of the polyethylene dispersion.

The mixture of catalyzed monomers consists of (in parts by weight):

| | |
|---|---|
| Styrene | 545 |
| Butyl acrylate | 665 |
| Methacrylic acid | 131 |
| Dicumyl peroxide | 28 |

The temperature is maintained between 125° and 130° C. during the reaction.

A 1h 1h30 plateau is then maintained to complete the polymerization stage.

The product obtained has the following characteristics and properties:

A runny, viscous solution, translucent in bulk, transparent in a thin layer,
Solids content—75%,
Product perfectly applicable with a doctor blade,
Smooth, dry, very glossy film.

I.1 PREPARATION OF AN AQUEOUS SOLUTION

The following mixture (in parts by weight) is prepared:

| | |
|---|---|
| solution with a solids content 75% (prepared above) | 100 |
| dimethylaminoethanol | 15 |
| water | 85 |

The solution obtained has a solids content of 50%.

This solution has a creamy consistency: it is white glossy and translucent.

It is easy to handle. Furthermore as demonstrated below, it can be diluted with water.

I.2 EXAMPLES OF DILUTION 1.2.1 / 34.3 parts by weight of water are added to 80 parts by weight of the solution with a solids content of 50%. An unctuous, smooth and whitish creamy solution is obtained, whose solids content is 35%. This latter solution can be applied with a doctor blade.

1.22 / 17.3 parts by weight of water and 17 parts by weight of isopropanol are added to 80 parts by weight of the solution with a solids content of 50%. A translucent solution which has a solids content of 35% and a Brookfield viscosity of 7,200 cPs is obtained. This latter solution, after application to paper gives a very glossy and smooth film which has an excellent water resistance (on immersion in water, or water on the film).

EXAMPLE II

The operating procedure and the nature and quantity of the reactants are identical with those in Example I, with the exception of the polyethylene, which is a hard wax with the following characteristics:

| | |
|---|---|
| Weight average (Mw) molecular weight | 2,900 |
| Crystallinity (%) | 40 |
| Viscosity at 140% (poises) | 0.7 |
| Melting range (°C.) | 106–112 |

The product obtained at the end of the polymerization process has the following characteristics and properties:

it is an easily handled waxy product, translucent in bulk, transparent in a thin layer. It has a solids content of 75%.

In accordance with the formula described in Example I, section (1.1), an aqueous solution with a solids content of 50% is prepared. This solution takes the form of a glossy, translucent mass which is difficult to handle at ambient temperature because of its high viscosity. On the other hand, this solution can be diluted with water in all proportions.

In fact, if this solution with a solids content of 50% is diluted (its solids content being taken to 35%) in accordance with the operating procedure described in Example I, section I.2.1, a creamy, smooth solution is obtained, which can be diluted with water, which can be applied with a doctor blade and which then gives glossy and smooth films.

Similarly, when this solution with a solids content of 50% is diluted, its solids content being taken to 35%, in accordance with the operating procedure described in Example 1, section I 2.2, a whitish solution is obtained whose viscosity is 9,200 cPs.

EXAMPLE III

The operating procedure and the nature and the quantity of the reactants are identical with those in Example I, with the exception of the polyethylene which is, in this example, a wax with the trade name Cire Poly Wax W - 2000, which has the following characteristics:

| | |
|---|---|
| Number average (Mn) molecular weight | 2,000 ± 200 |
| Weight average molecular weight (Mw) | 2,300 ± 200 |
| Crystallinity (%) | 80 |
| Viscosity at 140° C. (poises) | 0.5 |
| Melting temperature (°C.) | 123–125 |

The polymerization temperature in this example has been maintained between 135° and 140° C.

The product obtained at the end of the polymerization has the following characteristics and properties:

It is a white, waxy product, opaque in bulk, which is translucent or transparent in a thin layer. Its solid content is 75%. Furthermore, this product is easy to handle and can be applied with a doctor blade.

In accordance with the formula described in Example I, section (I.1), an aqueous solution with a solids content of 50% is prepared. A way mass is obtained which is translucent in a thin layer and which, after application, gives very glossy and dry films.

This translucent mass is easy to handle and can also be diluted with water.

In fact, when the solution with a solids content of 50% is diluted, its solids content being taken to 35% in accordance with the operating procedure described in Example I, section I.21, an unctuous, smooth creamy product is obtained which can be applied with a doctor blade. After application it gives highly water-resistant, glossy films. This product can also be diluted with water.

Similarly, when the solution with a solids content of 50% is diluted, its solids content being taken to 35% in accordance with the operating procedure described in Example I, section I.2.2, a whitish solution is obtained whose Brookfield viscosity is 4,800 cPs.

EXAMPLE IV

The operating procedure and the nature and quantity of the reactants are identical with those in Example I, with the exception of the nature of the solvent, which is ethoxypropanol and of the nature of the polyethylene which is, in this example, an ethylene terpolymer obtained by polymerization of (in % by weight):

| | |
|---|---|
| ethylene | 90.5 |
| ethyl acrylate | 6.0 |
| maleic anhydride | 3.5 |

Furthermore, this terpolymer has the following characteristics:

| | |
|---|---|
| Number average molecular weight (Mn) | 12,000 |
| Weight average molecular weight (Mw) | 40,200 |
| Viscosity at 140° C. (poises) | 1,800 ± 200 |
| Viscosity at 190° C. (poises) | 300 |
| Melt index (ASTM standard D 1238) (g/min) | 200 |
| Crystallinity (%) | 28 ± 3 |
| Melting region (°C.) | 95 to 102 |

At the end of reaction, a slightly opalescent clear solution with a solids content of 80% is obtained, which has a viscosity of 500,000 cPs. The product obtained applied in a thin layer (doctor blade) gives dry films which have a high gloss.

Furthermore, the product obtained can be diluted with organic solvents, for example with ethyl acetate.

The viscosities (expressed in cPs) obtained by dilution of the product with a solids content of 80% with ethyl acetate are collated in the table below.

| Solids content % by weight | 70 | 63.8 | 60 | 50 | 40 | 30 |
|---|---|---|---|---|---|---|
| Viscosity (cPs) | 24,500 | 4,750 | 1,900 | 620 | 80 | 22 |

After neutralization with an amine, the solution with a solid content of 80% can be diluted with water to give aqueous solutions which are perfectly stable, if appropriate in the presence of a cosolvent for example an alcohol such as methyl ether, propylene glycol or ethoxypropanol.

The following (in parts by weight) are added to 100 parts by weight of the solution with a fluids amount of 80%:

| | |
|---|---|
| propylene glycol methyl ether | 15 |
| dimethylaminoethanol | 7 |
| water | 38 |

The solution obtained has the following characteristics:

| | |
|---|---|
| solids content (% by weight) | 50 |
| pH | 9.1 |
| Viscosity (cPs) | 10,000 |

This solution can be diluted with water.

The viscosities (expressed in cPs) obtained by diluting the solution with a solid content of 50% with water are collated in the table below.

| Solids content % by weight | 40 | 30 | 25 | 20 | 16.7 | 13.3 |
|---|---|---|---|---|---|---|
| Viscosity (cPs) | 36,500 | 500,000 | 600 | 47.5 | 25 | 15 |

The preceding examples can be repeated with similar success by substituting the generically or specifically described reactants and/or operating conditions of this invention for those used in the preceding examples.

All patents and publications referred to above and also those in the attached Information Disclosure Statement are incorporated by reference herein along with applicants' French priority application No. 8714599, filed Oct. 22, 1987.

From the foregoing description, one skilled in the art can easily ascertain the essential characteristics of this invention, and without departing from the spirit and scope thereof, can make various changes and modifications of the invention to adapt it to various usages and conditions.

We claim:

1. Graft copolymers of ethylene polymers and copolymers, characterized in that they are thermoplastic and are prepared by polymerization of (in % by weight relative the resin obtained):

0.5 to 30% of a backbone polymer of at least one unoxidized polyethylene and/or an unoxidizied ethylene copolymer based on at least 70% by weight of ethylene and a comonomer optionally containing ester, a hydride of acid functional group, said polyethylene or ethylene copolymer being defined by the following properties: a weight average molecular weight (Mw) of between 900 and 60,000, a Brookfield viscosity at 190° C. of between 0.1 and 500 poises and/or a Brookfield viscosity at 140° C. of between 0.1 and 2,000 poises, a crystallinity, measured by X-ray, of between 10% and 80%, 70 to 99.5% of styrene-based, vinyl, acrylic and/or methacrylic grafting monomers, in the presence of at least one free radical initiator and of at least one organic solvent, said graft copolymer being soluble at ambient temperature in alcohols, esters, ethers, or ketones.

2. A graft copolymer according to claim 1, prepared by a process wherein a/ a disperse phase is prepared by dispersing at least one unoxidized polyethylene and/or at least one ethylene copolymer in at least one organic solvent, with stirring, at a temperature above the melting temperature of the said polyethylene or of the said ethylene copolymer, b/ at least one of said grafting monomer and at least one radical polymerization initiator are then introduced progressively into the disperse phase obtained, so as to allow grafting of monomer chains onto the polyethylene and/or onto the ethylene copolymer, c/ the reaction is then continued at a temperature equal to or higher than that chosen in step (b), and d/ at the end of the reaction, the resin obtained is cooled.

3. A graft copolymer according to claim 1, wherein the backbone polymer is a polyethylene wax.

4. A graft copolymer according to claim 2, wherein the background polymer is a polyethylene wax.

5. A solution at ambient temperature containing a dissolved solids contents of at least about 35% of the graft copolymer of claim 1.

6. A solution according to claim 5, wherein the solution is aqueous.

7. A solution according to claim 5 in an organic solvent.

8. Graft copolymers according to claim 1, wherein said grafting monomers consist essentially of (meth)acrylic acid, (meth)acrylic esters, styrene, methylstyrene, or vinyl acetate.

9. A process for preparing resins according to claim 8, wherein:
   (a) a disperse phase is prepared by dispersing at least one unoxidized polyethylene and/or at least one ethylene copolymer in at least one organic solvent, with stirring, at a temperature above the melting temperature of the polyethylene or of the ethylene copolymer,
   (b) at least one of said grafting monomers and at least one radical polymerization initiator are then introduced progressively into the disperse phase obtained, so as to allow grafting of monomer chains onto the polyethylene and/or the ethylene copolymer,
   (c) the reaction is then continued at a temperature equal to or higher than that chosen in step (b); and
   (d) at the end of the reaction, the resin is cooled.

10. Graft copolymers according to claim 2, wherein said grafting monomers consist essentially of (meth)acrylic acid, (meth)acrylic esters, styrene, methylstyrene, or vinyl acetate.

11. A graft copolymer according to claim 1, wherein said grafting monomers consist essentially of at least one of styrene, butylacrylate, and methacrylic acid.

12. A graft copolymer according to claim 1, wherein said grafting monomers consist essentially of a mixture of styrene, butylacrylate, and methacrylic acid.

13. A process for preparing resins according to claim 12, wherein:
   (a) a disperse phase is prepared by dispersing at least one unoxidized polyethylene and/or at least one ethylene copolymer in at least on organic solvent, with stirring, at a temperature above the melting temperature of the polyethylene or of the ethylene copolymer,
   (b) at least one of said grafting monomers and at least one radical polymerization initiator are then introduced progressively into the disperse phase obtained, so as to allow grafting of monomer chains onto the polyethylene and/or the ethylene copolymer,
   (c) the reaction is then continued at a temperature equal to or higher than that chosen in step (b), and
   (d) at the end of the reaction, the resin is cooled.

* * * * *